May 3, 1960  W. PATT  2,935,216
FEEDING OF SUGAR TABLETS TO WRAPPING MACHINES
Filed Dec. 24, 1958  2 Sheets-Sheet 1
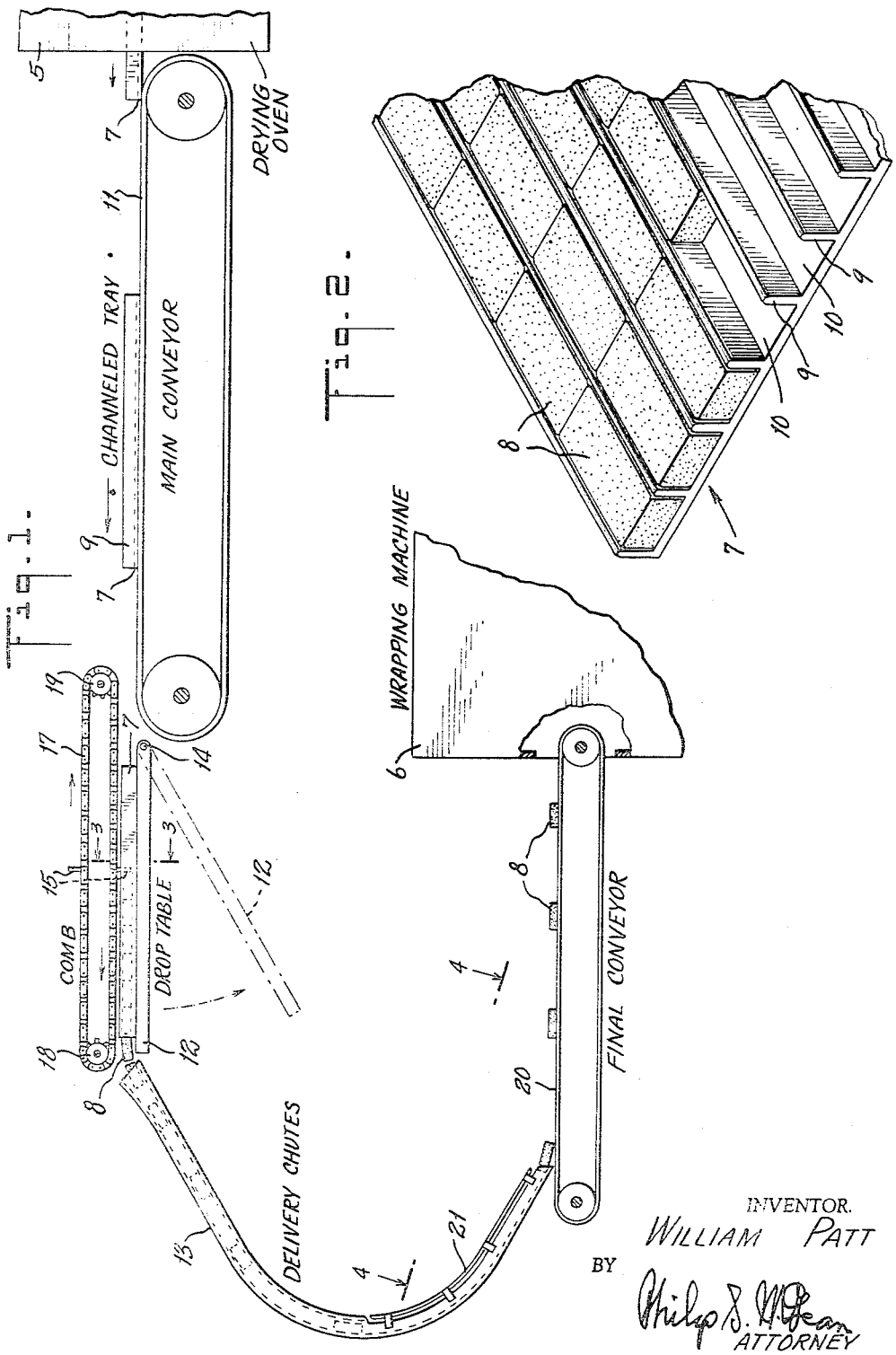
INVENTOR.
WILLIAM PATT
BY
Philip S. McLean
ATTORNEY

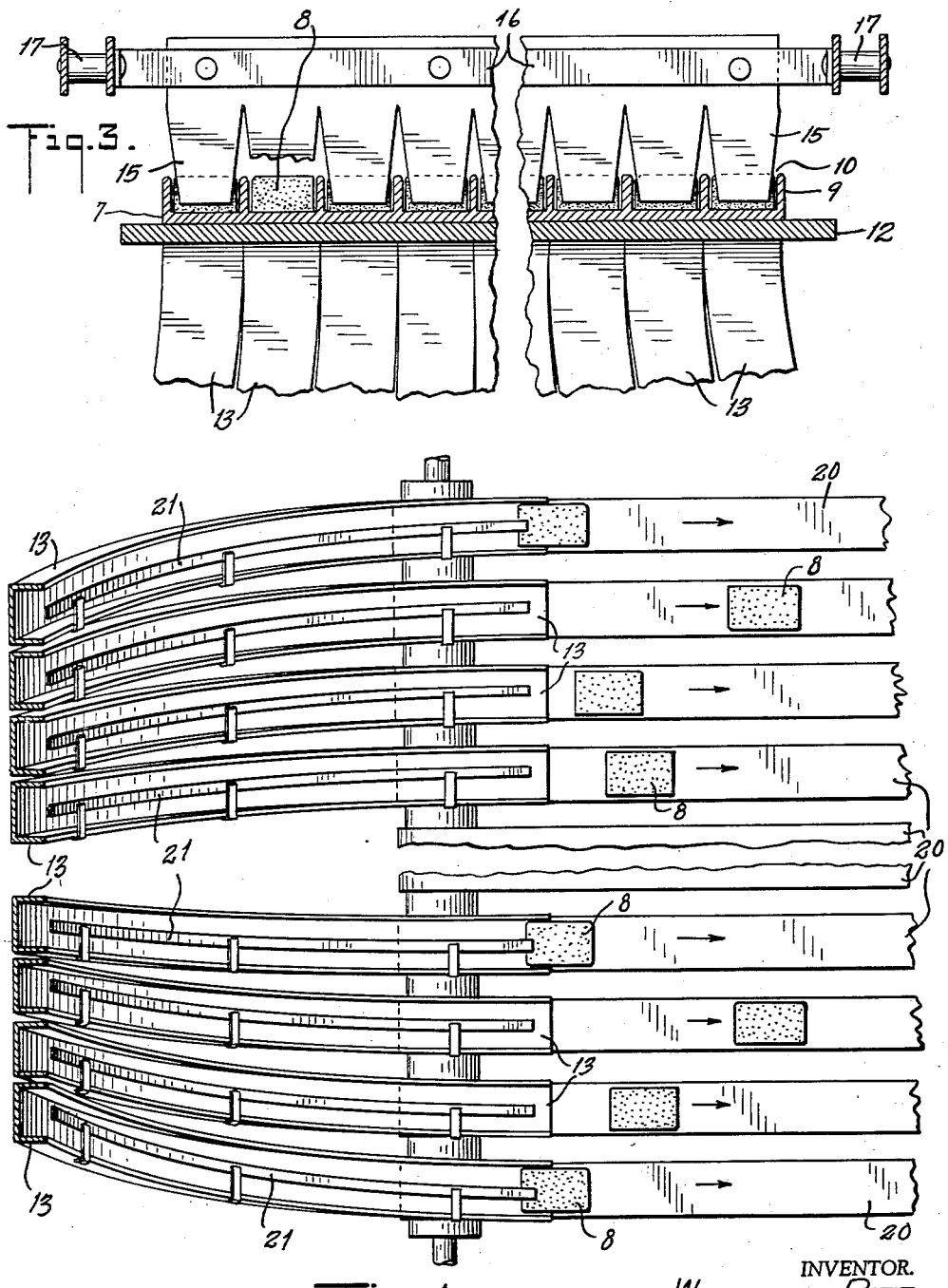

United States Patent Office 2,935,216
Patented May 3, 1960

2,935,216

FEEDING OF SUGAR TABLETS TO WRAPPING MACHINES

William Patt, Brooklyn, N.Y.

Application December 24, 1958, Serial No. 782,747

2 Claims. (Cl. 214—310)

The invention herein disclosed relates to the feeding of pressed sugar tablets to wrapping machines.

The general practice heretofore has been to dump the pressed tablets of sugar onto a feed table and then to sort and direct the individual tablets by hand in proper straightened relation to the wrapping machines. This is a time consuming and tiresome operation resulting in loss of efficiency.

Objects of the present invention are to eliminate the hand operations mentioned and to avoid the losses occasioned thereby.

Generally speaking this has been accomplished by retaining the tablets in the form and relation in which they have been originally pressed, all the way to the wrapping machines, without disturbance or change, by pressing them out in the first instance on channelled trays and then combing them in that same relation to chutes delivering them in that relation to the final conveyors entering the wrapping machines.

Further special objects of the invention are to provide apparatus of the character indicated which will be fully practical and efficient for the purposes intended.

The foregoing and other desirable objects have been effected through the combination of certain novel features as hereinafter described and claimed.

The drawings accompanying and forming part of this specification are illustrative of a present practical embodiment of the invention. Structure, however, may be modified and changed as regards the immediate illustration all within the true intent and scope of the invention herein defined and claimed.

Fig. 1 in the drawings is a schematic and partly sectional view of one simple embodiment of the invention.

Fig. 2 is a perspective and part broken view of one of the partitioned trays used in the invention.

Fig. 3 is an enlarged cross sectional view on substantially the plane of line 3—3 of Fig. 1 showing the comb fingers for advancing the sugar from the partitioned trays into the delivery chutes.

Fig. 4 is an enlarged and broken sectional view on substantially the plane of line 4—4 of Fig. 1 illustrating delivery of the tablets from the chutes onto the final conveyors.

In Fig. 1 the invention is shown as comprising related means for conveying and directing the sugar tablets in controlled relation from the press and drying oven at the end of the production line to the wrapping machines.

The drying oven is indicated at 5 and the wrapping machine at 6. These may be of conventional design.

One of the important features of the invention is the provision of partitioned trays 7 which take the sugar tablets 8 from the revolving press and which, differing from the usual flat plates, have upright partitions 9 spaced to provide channels 10 holding the pressed sugar tablets symmetrically aligned.

The partitioned trays 7 after receiving the pressed tablets and passing through the drying oven or other finishing medium are transferred by a main conveyor 11 onto a table 12 which after delivery of the tablets into chutes 13 is arranged to drop to discharge the emptied tray and then be raised ready for reception of the next, loaded tray.

This drop table 12 is shown pivotally supported at 14 at the end nearest the main conveyor and mechanism is provided for lowering and raising the table in time with discharge operations of the trays.

The sugar tablets are stripped from the partitioned trays in aligned order by a comb construction consisting of fingers 15, Fig. 3 carried by cross bars 16 supported between a pair of endless chains 17, in line with the channels 10 containing the product.

The chains 17 are shown as supported and driven by sprocket gears 18, 19 operating in timed relation with delivery of the loaded trays onto the drop table 12.

The chutes 13 are shown as extending in alignment from the ends of the channels in the trays into register with the final conveyors 20, Fig. 1, which carry the tablets, still in directed alignment into the wrapping machines 6.

The delivery chutes may be open channels, as shown in the lower portions of Figs. 1 and 4.

The upright walls or partitions 8 of the trays may be of less height than the sugar tablets or, as indicated in Fig. 2, be of substantially the same height so as to permit stacking of trays one on top of the other, if that be found desirable in the operation of the machine.

The invention, it will be seen, provides simple and practical means for keeping the sugar tablets in symmetrical order and in proper alignment to be operated on by the wrapping mechanism, all the way from the final production line to the wrapping machines, without interposition of any manual operations.

The channels in the trays are of a size to readily receive and lightly hold and guide the rectangularly shaped pieces so that the extracting fingers 15, which may be of springy sheet metal, will have no difficulty in discharging them into the delivery chutes. These fingers are shown as flattened so as to fully engage and push the flat ended tablets off the tray.

The final conveyors 20 are shown in Fig. 4 as of approximately the same width as the delivery chutes 13. These final conveyors each lead to a wrapping machine or possibly in the case of a multiple machine, to one of the wrapping units in such a machine and these may, if considered desirable, have guide flanges at opposite edges of the same to make sure of the pieces riding straight into the wrapping mechanism.

If considered desirable the comb chains 17 may carry a pusher to engage the tray after the tablets of sugar have been discharged therefrom, to push the tray down off the lowered table.

What is claimed is:

1. Apparatus for delivering sugar tablets from a loading station to a wrapping machine in alignment required for proper operation of the wrapping machine and comprising separate channelled trays having spaced upstanding parallel partitions defining open ended channels approximately the height of the tablets and slightly wider than the tablets to slidingly hold and guide rows of tablets in longitudinal alignment, downwardly inclined delivery chutes for said tablets of the same width as the channels on the trays, said chutes having open upper ends positioned to match the channels in said trays, a tray support in front of said open upper ends of said chutes, a main conveyor for transferring trays from the loading station into position on said support with the ends of the channels in the trays in register with the open upper ends of the delivery chutes, a final conveyor at the lower ends of said delivery chutes lined up to receive and deliver tablets discharged from the chutes in required alignment into the wrapping machine and a comb traveling over said support toward the upper ends of the delivery chutes and having fingers reaching downward far enough to enter the open ends of channels of trays positioned on the support and to traverse the length of said channels whereby to feed rows of aligned tablets from individual trays which will be automatically delivered by said chutes and final conveyor in properly aligned relation to be wrapped by the wrapping machine.

2. The invention according to claim 1 with means for effecting discharge of unloaded trays from said support and including the pivotal mounting of said tray support at one end enabling the lowering of said support to drop an emptied tray off the same.

References Cited in the file of this patent
UNITED STATES PATENTS

| | | |
|---|---|---|
| 1,208,802 | Lienau et al. | Dec. 19, 1916 |
| 1,365,120 | Myers | Jan. 11, 1921 |
| 1,556,438 | Hanson et al. | Oct. 6, 1925 |
| 1,860,143 | Fuller et al. | May 24, 1932 |